United States Patent
Paran et al.

(10) Patent No.: US 11,272,254 B1
(45) Date of Patent: Mar. 8, 2022

(54) SYSTEM, METHOD, AND COMPUTER PROGRAM FOR USING USER ATTENTION DATA TO MAKE CONTENT RECOMMENDATIONS

(71) Applicant: Amdocs Development Limited, Limassol (CY)

(72) Inventors: Eran Yosef Paran, Hod Hasharon (IL); Liat Taub Bahar, Kfar Sabba (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/986,047

(22) Filed: Aug. 5, 2020

(51) Int. Cl.
| | |
|---|---|
| *H04N 21/466* | (2011.01) |
| *H04N 21/442* | (2011.01) |
| *H04N 21/414* | (2011.01) |
| *G06N 5/04* | (2006.01) |
| *H04N 21/81* | (2011.01) |
| *G06N 20/00* | (2019.01) |
| *H04N 21/45* | (2011.01) |

(52) U.S. Cl.
CPC ........... *H04N 21/4668* (2013.01); *G06N 5/04* (2013.01); *G06N 20/00* (2019.01); *H04N 21/41407* (2013.01); *H04N 21/44222* (2013.01); *H04N 21/4532* (2013.01); *H04N 21/4662* (2013.01); *H04N 21/4667* (2013.01); *H04N 21/812* (2013.01)

(58) Field of Classification Search
CPC .................................................... H04N 21/466
See application file for complete search history.

(56) References Cited

U.S. PATENT DOCUMENTS

| | | | |
|---|---|---|---|
| 2003/0070182 A1* | 4/2003 | Pierre ................ | H04N 21/4325 725/135 |
| 2013/0014145 A1* | 1/2013 | Bhatia .................... | H04H 60/31 725/13 |
| 2020/0296456 A1* | 9/2020 | Yungster ............ | H04N 21/4668 |
| 2020/0401522 A1* | 12/2020 | Xu ...................... | G06F 16/9574 |
| 2021/0227009 A1* | 7/2021 | Carney Landow ... | H04L 65/602 |

* cited by examiner

*Primary Examiner* — Michael H Hong
(74) *Attorney, Agent, or Firm* — Zilka-Kotab, P.C.

(57) ABSTRACT

As described herein, a system, method, and computer program are provided for deriving user attention data. In use, user attention data is collected for a user. The user attention data includes first information describing content being viewed by a user on a first device, and second information describing user activity occurring on the first device and/or one or more second devices while the content is being viewed by the user on the first device. Further, the first information and the second information are processed, using a machine learning model, to predict a degree to which the user likes the content. Still yet, the prediction is output for use in making one or more content recommendations.

15 Claims, 5 Drawing Sheets

SYSTEM, METHOD, AND COMPUTER PROGRAM FOR USING USER ATTENTION DATA TO MAKE CONTENT RECOMMENDATIONS

FIELD OF THE INVENTION

The present invention relates to techniques for making content recommendations.

BACKGROUND

Content providers have significant interest in determining content that is relevant (e.g. personalized) to its users. This content may be media content and/or advertisements. There are various parameters that have been used to identify content that is relevant to users, such as demographics of the users, location of the users, content viewing activity of the users, among other information.

One parameter that is particularly useful for determining relevancy of content to users relates to a degree to which the users are expected to like the content. This parameter can be estimated for a particular user, at least in part, based on prior content viewing activity of that user, including an evaluation of a degree to which the user liked the content previously viewed. Algorithms currently exist which evaluate the extent to which a user likes content (i.e. finds the content agreeable). However, these algorithms focus on the user's behavior as it relates to the content itself, such as whether the user watched an entirety of the content, whether the user watched similar content after viewing the content, etc., which limits the degree of accuracy in the evaluation results. For example, these algorithms have not taken into consideration the multi-tasking behavior of the user while viewing content.

There is thus a need for addressing these and/or other issues associated with the prior art.

SUMMARY

As described herein, a system, method, and computer program are provided for deriving user attention data for use in making content recommendations. In use, user attention data is collected for a user. The user attention data includes first information describing content being viewed by a user on a first device, and second information describing user activity occurring on the first device and/or one or more second devices while the content is being viewed by the user on the first device. Further, the first information and the second information are processed, using a machine learning model, to predict a degree to which the user likes the content. Still yet, the prediction is output for use in making one or more content recommendations.

DETAILED DESCRIPTION

Figure 1:
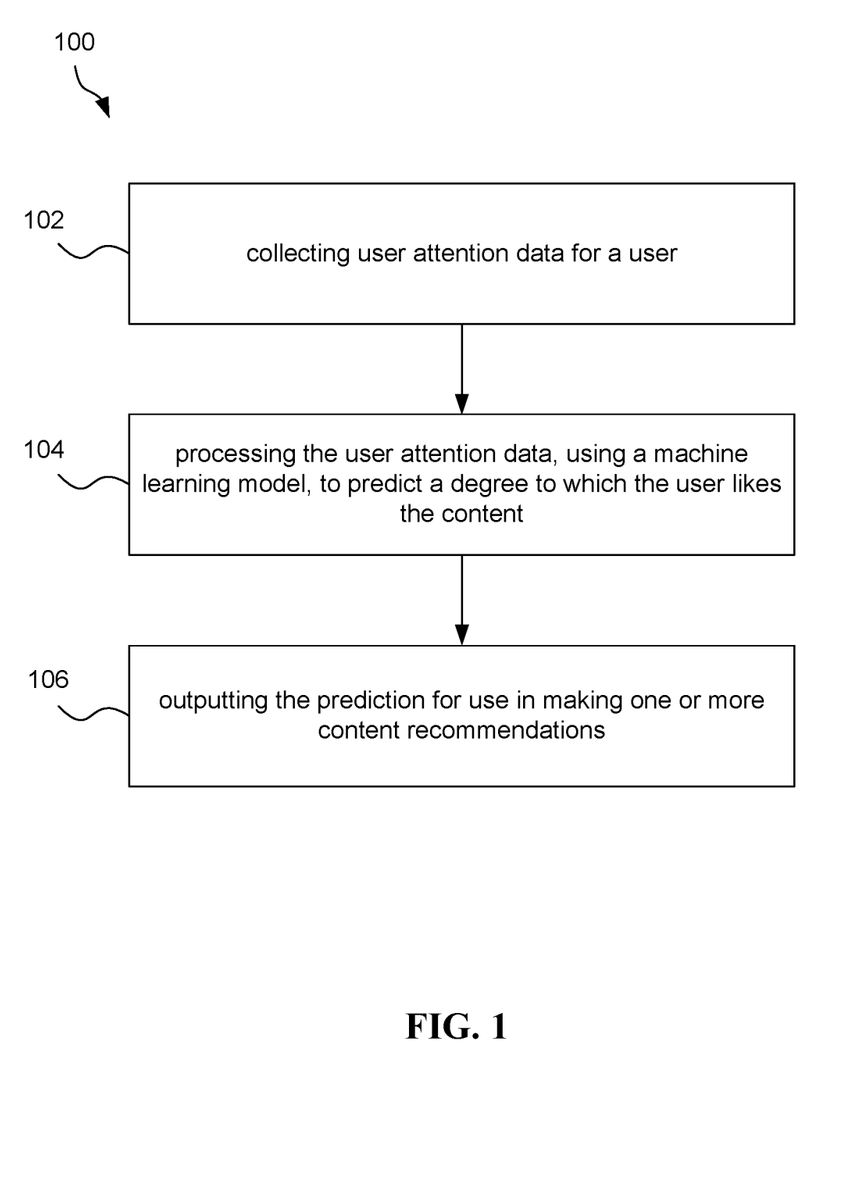
FIG. 1 illustrates a method for using user attention data to make content recommendations, in accordance with one embodiment.

FIG. 1 illustrates a method for using user attention data to make content recommendations, in accordance with one embodiment. The method 100 may be performed by a system (e.g. server, etc.), such as a system of a content provider, and in particular a communication service provider (CSP). The CSP is an entity, formed as a system architecture, which provides services to users. In the present embodiment, the services include at least a content distribution service, such as a media, television and/or streaming service. However, the services may additionally include communication services, such as an Internet service, a telephone service, etc.

The CSP has customers which are users of one or more services of the CSP. In one embodiment, the customers may each have an account with the CSP (i.e. may be subscriber to the one or more services of the CSP). The system may thus have access to information stored for its customers, such as account information, demographic information, service usage information, location information, etc.

In operation 102, user attention data is collected for a user. The user attention data refers to data indicative of a degree to which a user's attention is given to content currently being viewed/presented on a device of the user. In the context of the present embodiment, the user attention data includes first information describing content being viewed by a user on a first device. In one embodiment, the first information may be collected via a first service of the CSP through which the content is viewed by the user. For example, the first information may be collected from a logs generated by the first service which indicate content viewed by its customers.

The content may be any viewable content capable of being distributed (e.g. streamed, downloaded, etc.) to users. To this end, the first device used by the user to view the content may be a television or mobile computing device (e.g. laptop, tablet, etc.) or even a stationary (desktop) computer. In one embodiment, the content may be a movie or a (live or prerecorded) television show. In another embodiment, the content may be an advertisement.

Also in the context of the present embodiment, the user attention data includes second information describing user activity occurring on the first device and/or one or more second devices while the content is being viewed by the user on the first device. The user activity may refer to a single instance of activity occurring on a single device, or multiple instances of activity occurring on multiple devices. In one embodiment, the second information may be collected via a second service (or multiple services) of the CSP through which the user activity occurs. For example, the second information may be collected from a logs, call detail records (CDRs), browsing reports, etc. generated by the second service which indicate user activity.

It should be noted that the user activity may be any type of activity of the user that is separate from the content viewing activity of the user. The second device may be a mobile phone, as an option. In one embodiment, the user activity may include the user browsing one or more websites. In another embodiment, the user activity may include the user communicating with at least one other person (e.g. by telephone call, short message service (SMS) messages, email, etc.

As noted above, the user attention data is collected as the user is simultaneously watching the content on the first device and performing other activity on the second device. In this way, the method 100 may be performed in real-time with respect to the user watching the content.

As shown in operation 104, the first information and the second information are processed, using a machine learning model, to predict a degree to which the user likes the content. Accordingly, the machine learning model may be any model of a machine learning algorithm trained to make predictions associated with users liking viewed content, particularly based on user activity occurring during viewing of the content.

For example, the machine learning model may be trained using training data that includes correlations between media viewed by users and additional activity of the users during the media viewing. The training data may also indicate a retrospective estimation of a degree to which the users liked the content viewed, such that the machine learning algorithm is able to learn a degree to which a user likes content based on his simultaneous content viewing and other activity.

As an option, the training data may also include demographic data for the users. The demographic data may indicate age, occupation, gender, geographic location, or any other information describing the users. To this end, the machine learning model may be trained to predict a degree to which a user likes content in a manner that is also based on that user's demographic data.

As noted above, the machine learning model processes the first information and the second information to predict the degree to which the user likes the content. However, the machine learning model may also process demographic information collected on the user, for use in predicting the degree to which the user likes the content.

Still yet, in operation 106, the prediction is output for use in making one or more content recommendations. In one embodiment, making the content recommendations may include selecting additional content to be targeted to the user. This additional content may include an advertisement, a television show, a movie, a business offer, or any other content. For example, the additional content may be third party content (e.g. an advertisement of a third party). As another example, the additional content may be content of the CSP (e.g. a business offer), which can be used by the CSP to increase stickiness/loyalty, increase lifetime value, etc. (all of which may be CSP desired key performance indicators (KPIs)).

For example, if the user is predicted to like the content being viewed to a threshold degree, then additional content relevant to the content being viewed may be recommended for being targeted to the user. However, as another example, if the user is predicted to not like the content being viewed to the threshold degree (i.e. less than the threshold degree), then the additional content relevant to the content being viewed may be prevented from being recommended for the user, or as another option other additional content (i.e. that is relevant to content other than that being viewed) may be recommended for being targeted to the user.

Moreover, the recommended additional content may be targeted to the user. Targeting the additional content to the user may include presenting the additional content to the user, presenting a clip of the additional content to the user, sending a link to the additional content to the user, etc. As an option, the additional content may be targeted to the user while the content is being viewed by the user (e.g. as a commercial, as an in-content advertisement, etc.). As another option, the additional content may be targeted to the user after the content has been viewed by the user.

To this end, the method 100 may improve the content recommendations that are made for users. In particular, this may be accomplished by more accurately predicting whether a user likes the content he is currently viewing, based on an analysis of the simultaneous activity by the user.

Just by way of example, during viewing of a movie or a television show, a user's attention is often disturbed with calls or text messages on his mobile phone. If the user ignores interruptions while viewing content, it may be inferred that the content the user is viewing is highly interesting to the user (i.e. there is a high user attention to the content). However, if he accepts a call or responds to SMS messages while viewing the content, it may be inferred that the content was less interesting to the user (i.e. there is a low user attention to the content). Of course, these assumptions may be dependent on demographics of the user. For example, the above assumptions may hold true for users of above a certain age, but may be the opposite for users below a certain age (e.g. where simultaneous activity indicates a high user attention to the content being viewed). In any case, predicting the user attention to the content may allow such user attention to be providing as a new input when determining what kind of content a content recommendation system should take into account.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
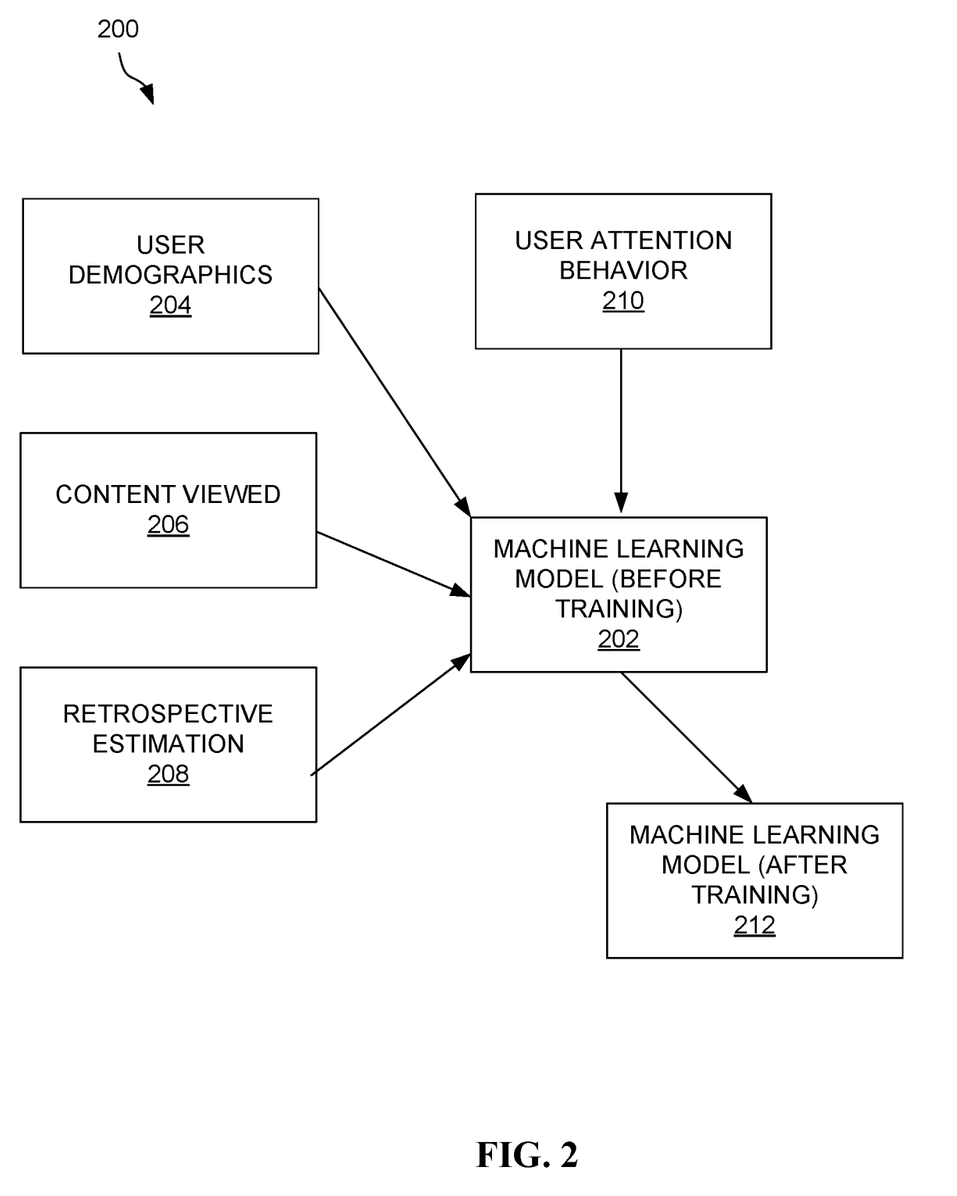
FIG. 2 illustrates a block diagram of a method for training a machine learning model to predict content that will be liked by users, in accordance with one embodiment.

FIG. 2 illustrates a block diagram of a method 200 for training a machine learning model to predict content that will be liked by users, in accordance with one embodiment. The method 200 may be carried out in the context of the details of the previous figure and/or any subsequent figure (s). Of course, however, the method 200 may be carried out in the context of any desired environment. Further, the aforementioned definitions may equally apply to the description below.

As shown, an untrained machine learning model 202 is trained by one or more machine learning algorithms which use training data to generate a trained machine learning model 212. While only one trained machine learning model 212 is shown, it should be noted that the output of the training may be multiple machine learning models, in another embodiment. The machine learning model 212 is trained to predict a degree to which a user likes content being viewed by the user, based at least in part on simultaneous activity of the user.

The training data may be provided for a plurality of users, such that the machine learning model 212 may be capable of making predictions for any desired user. The training data includes user demographics 204, content viewed 206, a retrospective estimation 208 of whether the user liked the content, and user attention behavior 210 previously learned for the user. The content viewed 206 may include metadata describing the content. In one embodiment, this metadata may be added as annotations to the content, for example as described in U.S. patent application Ser. No. 16/986,034, filed herewith on Aug. 5, 2020, and entitled "REAL-TIME BIDDING BASED SYSTEM, METHOD, AND COMPUTER PROGRAM FOR USING IN-VIDEO ANNOTATIONS TO SELECT RELEVANT ADVERTISEMENTS FOR DISTRIBUTION", the entire contents of which are incorporated herein by reference.

The retrospective estimation 208 may be calculated based on various information, such as whether the user watched an entirety of the content (i.e. to the end of the content), whether the user made any social media posts about the content, whether the user watched any related content after watching the content, user attention while watching the content, etc. The user attention behavior 210 previously learned for the user may include an indication of whether the user engaged in other activity (e.g. phone calls, SMS messages, upload and/or download of data, watching additional content, etc.) while watching the content, for example.

Figure 3:
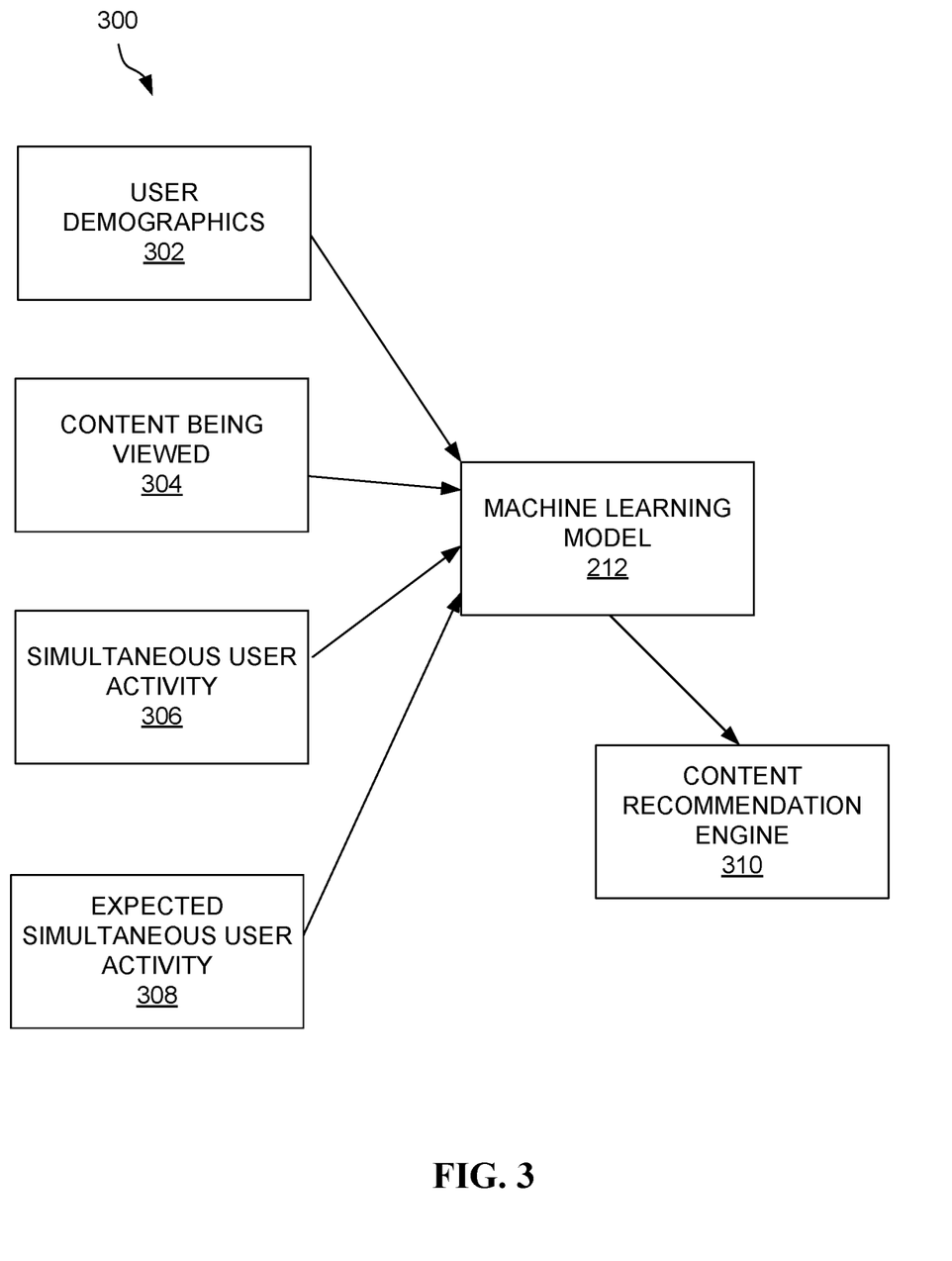
FIG. 3 illustrates a block diagram of a method for using the machine learning model of FIG. 2 to predict in real-time whether a user will like content, in accordance with one embodiment.

FIG. 3 illustrates a block diagram of a method 300 for using the machine learning model of FIG. 2 to predict in real-time whether a user will like content, in accordance with one embodiment.

As shown, the machine learning model 212 processes various input data to predict in real-time whether a user will like content that is currently being viewed by the user. The input data includes demographics of the user 302, content being viewed by the user 304, simultaneous activity of the user 306, and expected simultaneous activity of the user 308. The expected simultaneous activity of the user 308 is determined based on prior user attention data collected on the user.

The output of the machine learning model 212 (i.e. the prediction) is provided to a content recommendation engine 310. The content recommendation engine 310 then makes one or more content recommendations for the user, based on the prediction. The content recommendations may refer to content recommended to be targeted to the user. The content recommendation engine may be a machine learning model, in one embodiment, where an attribute of the user input to the model may be a user attention score. The user attention score may be based on number of factors, such as number of interruptions during a view of content, the time between interruptions, type of interruption (e.g. call or SMS, etc.) and the user's responses to these interruptions.

In one embodiment, it may be determined that the user is about to share information associated with content being viewed (i.e. based on prior user attention data collected for that user). In another embodiment, recommendations can be made to improve an experience of the user, such as recommending additional content at a different time and/or place when the user is predicted to not be liking the content being viewed. In yet another embodiment, a level of engagement (attention) to content may be determined, which may be a parameter used by advertisers when bidding on advertisement slots associated with the content.

Further, the prediction may be validated by determining whether the user actually liked the content or not. This validation may be performed based actions later taken by the user.

Figure 4:
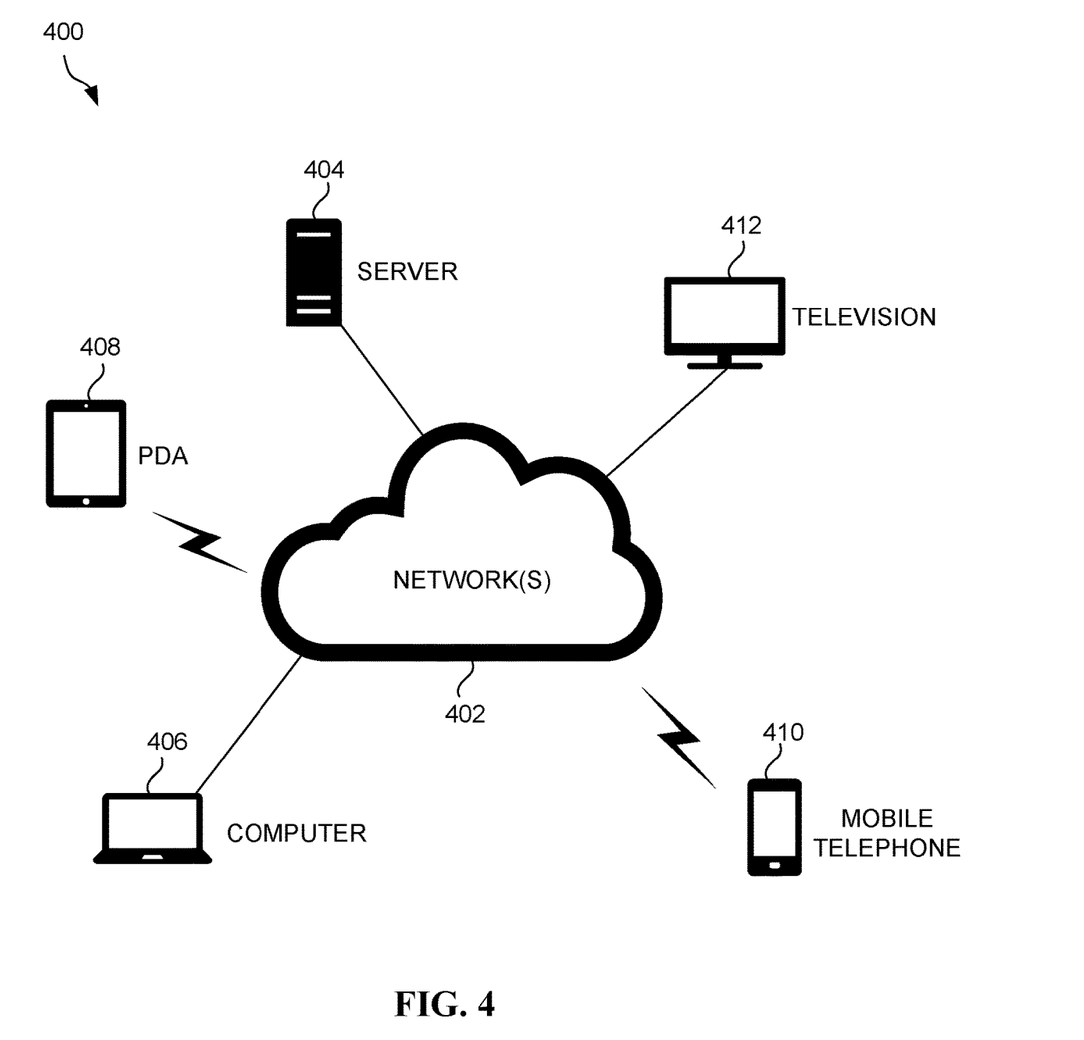
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
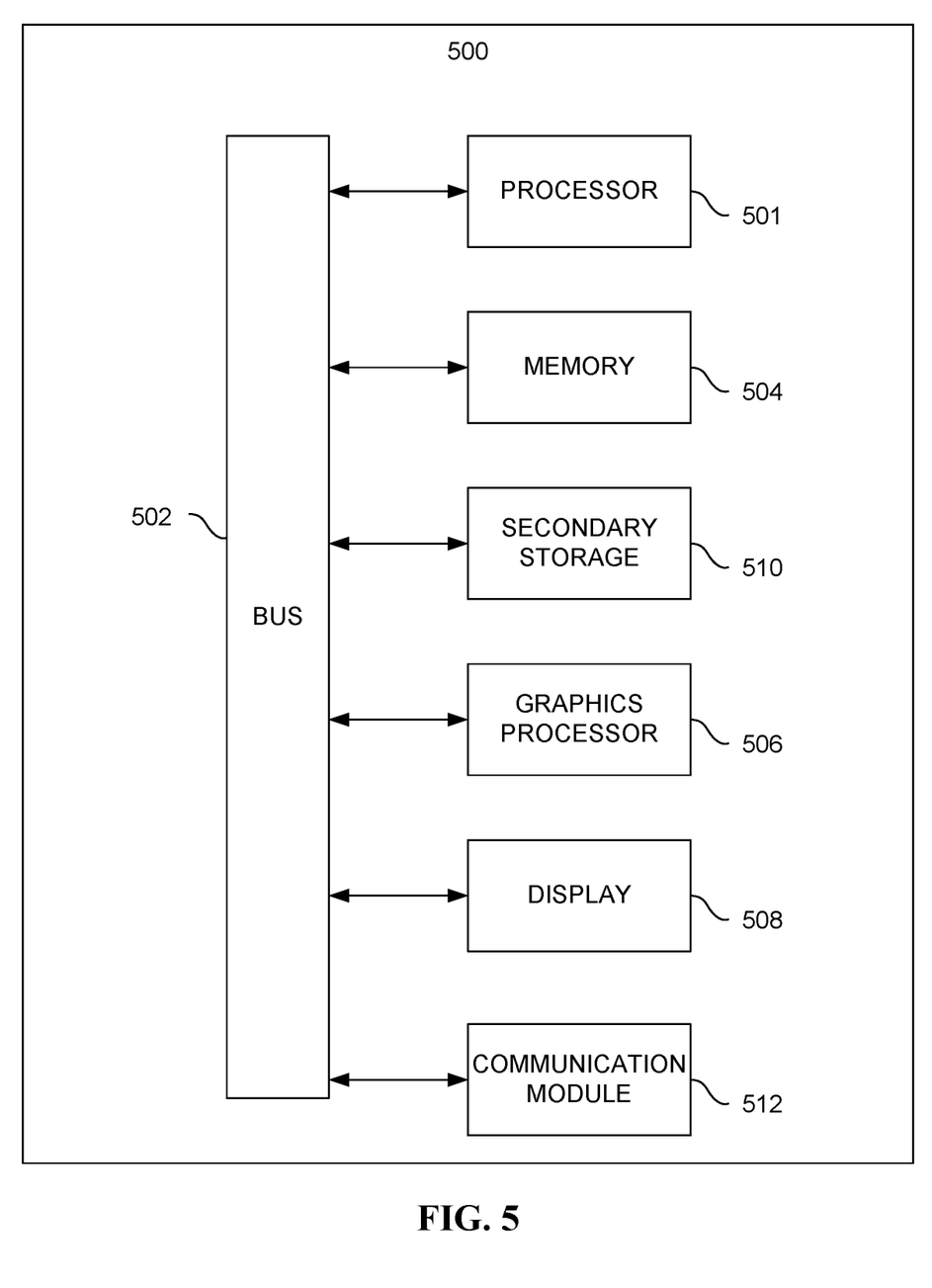
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:

collecting user attention data for a user, the user attention data including:
   first information describing content being viewed by a user on a first device, wherein the first information indicates that the user is viewing a movie or television show on the first device, and
   second information describing user activity occurring on at least one of the first device or one or more second devices while the content is being viewed by the user on the first device, wherein the second information indicates a call or text message received by the user on the first device or a second device;
processing the user attention data, using a machine learning model, to predict a degree to which the user likes the content, wherein the machine learning model is a model of a machine learning algorithm trained to make predictions associated with users liking viewed content based on user activity occurring during viewing of the content, and wherein:
   when the user activity described by the second information includes the user ignoring the call or text message, then the machine learning model predicts that the movie or television show is interesting to the user, and
   when the user activity described by the second information includes the user accepting the call or responding to the text message, then the machine learning model predicts that the movie or television show is less interesting to the user than when the user activity described by the second information includes the user ignoring the call or text message; and
outputting the prediction for use in making one or more content recommendations.

2. The non-transitory computer readable medium of claim 1, wherein the method is performed by a communication service provider providing a first service through which the content is viewed and a second service through which the user activity occurs.

3. The non-transitory computer readable medium of claim 1, wherein the first device is one of a television or a mobile computing device.

4. The non-transitory computer readable medium of claim 1, wherein the one or more second devices include a mobile phone.

5. The non-transitory computer readable medium of claim 1, wherein the machine learning model is trained using training data that includes:
   demographic data for a plurality of users, and
   correlations between media viewed by the plurality of users and additional activity of the plurality of users during the media viewing.

6. The non-transitory computer readable medium of claim 1, wherein the machine learning model further processes demographic information collected on the user, for use in predicting the degree to which the user likes the content.

7. The non-transitory computer readable medium of claim 1, wherein making the one or more content recommendations includes selecting additional content to be targeted to the user.

8. The non-transitory computer readable medium of claim 1, further comprising:
   targeting the additional content to the user.

9. The non-transitory computer readable medium of claim 7, wherein the additional content is an advertisement.

10. The non-transitory computer readable medium of claim 7, wherein the additional content is a movie or a television show.

11. The non-transitory computer readable medium of claim 8, wherein the additional content is targeted to the user while the content is being viewed by the user.

12. A method, comprising:
   collecting user attention data for a user, the user attention data including:
      first information describing content being viewed by a user on a first device, wherein the first information indicates that the user is viewing a movie or television show on the first device, and
      second information describing user activity occurring on at least one of the first device or one or more second devices while the content is being viewed by the user on the first device, wherein the second information indicates a call or text message received by the user on the first device or a second device;
   processing the user attention data, using a machine learning model, to predict a degree to which the user likes the content, wherein the machine learning model is a model of a machine learning algorithm trained to make predictions associated with users liking viewed content based on user activity occurring during viewing of the content, and wherein:
      when the user activity described by the second information includes the user ignoring the call or text message, then the machine learning model predicts that the movie or television show is interesting to the user, and
      when the user activity described by the second information includes the user accepting the call or responding to the text message, then the machine learning model predicts that the movie or television show is less interesting to the user than when the user activity described by the second information includes the user ignoring the call or text message; and
   outputting the prediction for use in making one or more content recommendations.

13. A system, comprising:
   a non-transitory memory storing instructions; and
   one or more processors in communication with the non-transitory memory that execute the instructions to perform a method comprising:
   collecting user attention data for a user, the user attention data including:
      first information describing content being viewed by a user on a first device, wherein the first information indicates that the user is viewing a movie or television show on the first device, and
      second information describing user activity occurring on at least one of the first device or one or more second devices while the content is being viewed by the user on the first device, wherein the second information indicates a call or text message received by the user on the first device or a second device;
   processing the user attention data, using a machine learning model, to predict a degree to which the user likes the content, wherein the machine learning model is a model of a machine learning algorithm trained to make predictions associated with users liking viewed content based on user activity occurring during viewing of the content, and wherein:
      when the user activity described by the second information includes the user ignoring the call or text message, then the machine learning model predicts that the movie or television show is interesting to the user, and
      when the user activity described by the second information includes the user accepting the call or responding to the text message, then the machine learning model predicts that the movie or television show is less interesting to the user than when the user activity described by the second information includes the user ignoring the call or text message; and
   outputting the prediction for use in making one or more content recommendations.

14. The system of claim 13, wherein the system is a communication service provider system.

15. The system of claim 14, wherein communication service provider system provides a first service through which the content is viewed and a second service through which the user activity occurs.

* * * * *